Dec. 1, 1953    A. B. OSGOOD ET AL    2,661,079
AIR CLEANER CONSTRUCTION
Filed Dec. 12, 1951    2 Sheets-Sheet 1
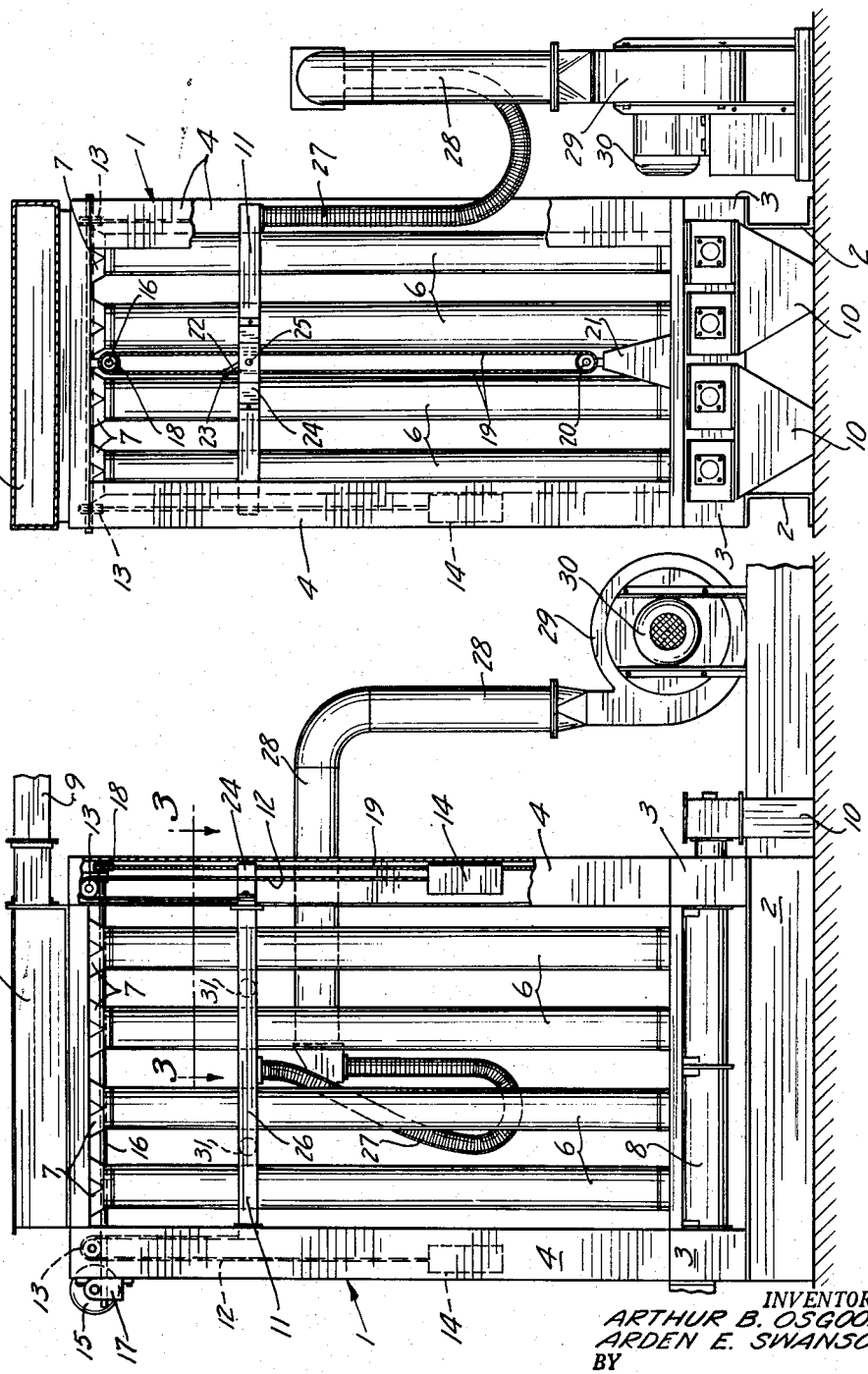
INVENTORS
ARTHUR B. OSGOOD
ARDEN E. SWANSON
BY
Merchant & Merchant
ATTORNEYS

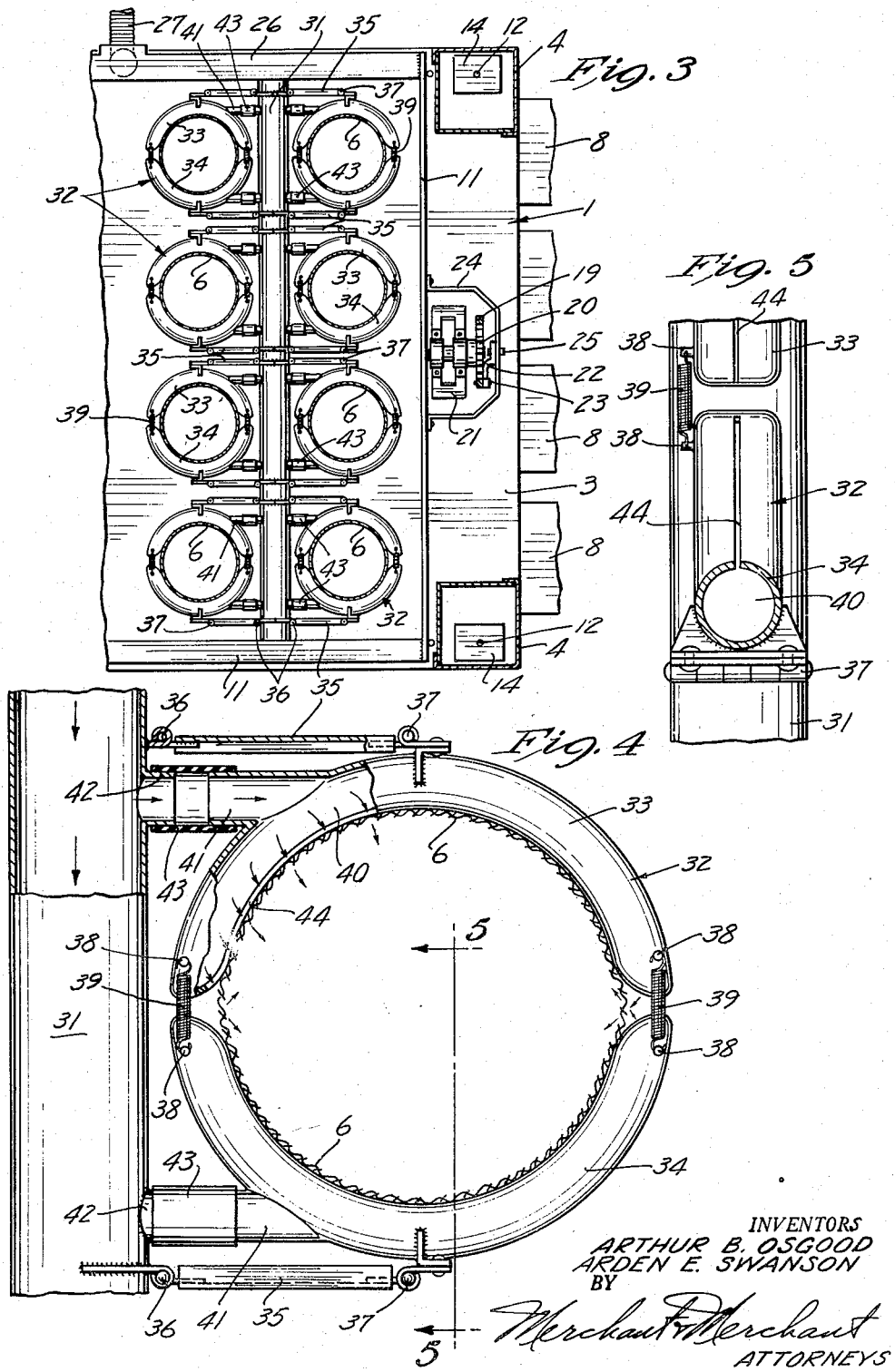

Patented Dec. 1, 1953

2,661,079

UNITED STATES PATENT OFFICE 2,661,079

AIR CLEANER CONSTRUCTION

Arthur B. Osgood and Arden E. Swanson, Minneapolis, Minn., assignors to The Day Company, Minneapolis, Minn., a corporation of Minnesota Application December 12, 1951, Serial No. 261,192

3 Claims. (Cl. 183—61)

Our invention relates generally to dust collecting and air cleaning equipment and more particularly to improvements in apparatus for cleaning dust collectors or air filters of the type utilizing flexible porous filter tubes.

The conventional tubular filter type of dust collector comprises a frame structure having at its upper end a plenum chamber to which is delivered dust laden air at relatively low pressure. A plurality of vertically extending tubular filters made from suitable porous fabric have their upper ends communicating with the plenum chamber and their lower ends connected to dust collecting hoppers that discharge the dust filtered out of the air to a suitable place of disposal. In this type of filter, the dust and other foreign matter separated from the air, as it passes outwardly through the interstices of the filter, tends to adhere to the inner wall of the filter tube and, if not removed, will tend to clog the filter. For this reason, the tubes must be maintained in a relatively clean or dust free condition.

Heretofore, cleaning of the tubes has been accomplished by providing rigid cleaning devices closely encompassing the tubes and having openings through which clean air at relatively high pressure was directed radially inwardly through the tubes as said devices were reciprocated slowly between the opposite ends of the tubes. The dust, falling to the bottom of the tube, is removed by suitable discharge mechanism. In many cases where dust is collected in large quantities, some of the dust tends to adhere to the inner wall of the tube sufficiently to cause bridging of the dust and the weight thereof causes the tube to bulge outwardly at the point where bridging occurs. Then, when the rigid cleaning device encounters the outwardly bulged portion of the tube, the movement of said cleaning device is stopped thereby and damage results to the tube or to the driving mechanism for the cleaning device.

An important object of our invention is the provision of a cleaning device for dust collectors or air filters of the type set forth which is capable of expansion and retraction to compensate for differences in filter tube diameter caused by bulging of the walls thereof.

Another important object of our invention is the provision of means whereby the cleaning device may properly engage each filter tube of a multiple tube dust collector throughout its length in a manner to compensate for variations in the distances between adjacent tubes in the event that said tubes are out of parallel arrangement.

Another object of our invention is the provision of a cleaning ring for filter tubes comprising a plurality of segmental ring sections movable toward and away from each other and of means whereby air is directed from the cleaning ring sections about the entire periphery of the tube when said sections are in close proximity to each other or in spread apart relationship.

Another object of our invention is the provision of novel means for mounting the several above-mentioned cleaning ring sections for independent lateral movements and of novel conduit means for delivering air under relatively high pressure to the cleaning ring sections without interfering materially with the lateral swinging movement thereof.

A still further object of our invention is the provision of a cleaning device, as set forth, which is relatively simple and inexpensive to manufacture, which is efficient in operation, and which is rugged in construction and durable in use.

The above and still further highly important objects and advantages of our invention will become apparent from the following detailed specification, appended claims, and attached drawings.

Referring to the drawings which illustrate the invention and in which like characters indicate like parts throughout the several views:

Fig. 1 is a view in side elevation of a conventional dust collector of the tubular filter type incorporating our invention, some parts being broken away and some parts being shown in section;

Fig. 2 is a view in front elevation of the device of Fig. 1, some parts being broken away and some parts shown in section;

Fig. 3 is an enlarged fragmentary view partly in plan and partly in section taken on the line 3—3 of Fig. 1;

Fig. 4 is an enlarged fragmentary view in plan of one of the cleaning rings of my invention, some parts being broken away and some parts shown in section; and Fig. 5 is a fragmentary detail taken substantially on the line 5—5 of Fig. 4.

Referring with greater detail to the drawings, the numeral 1 indicates in its entirety a frame structure comprising base frame members 2 and 3, a plurality, as shown at 4, of vertically extended hollow frame members or legs 4 supporting at their upper ends a plenum chamber or the like 5. A plurality of rows of laterally spaced parallel filter tubes 6 are secured at their upper ends to fittings 7 of the plenum chamber 5 and at their lower ends to feeder outlet hoppers 8 mounted in and between the base frame members 3. The filter tubes 6 are preferably made from fine mesh textile fabric adapted to permit air under pressure to pass through the interstices thereof to prevent dust from escaping outwardly therethrough. Dust laden air is delivered to the plenum chamber 5 from a chamber or building, not shown, where the dust accumulates, such as certain rooms or chambers in a flour mill, grain elevator, or any other manufacturing or processing plant where generation and accumulation of dust constitutes a hazard. The dust laden air is fed to the plenum chamber 5 under relatively low pressure through a duct 9, shown fragmentarily in Fig. 1, by means of a conventional fan or blower, not shown.

As the dust is separated from the air passing outwardly through the walls of the filter tubes 6, it is ultimately deposited in the hoppers 8 from whence it is removed by conventional means, not shown but contained within the hoppers 8, to a place of disposal through suitable conduit means 10. The mechanism within the hoppers 8 is adapted to gather and convey the settled out dust and other foreign matter without permitting passage of more than a minimum of air therethrough and the conduit means 10. The above-described mechanism is known to be old in the art and, in itself, does not comprise the instant invention. Hence, for the sake of brevity, it is not deemed necessary to disclose the same in greater detail.

In filters of the type above described, dust separated from the air passing outwardly through the walls of the tubes 6 tends to adhere to the tube walls, the particles thereof closing the interstices in the tube walls and restricting the air flow therethrough so that greater power is needed to maintain the proper flow of air through the filter. For this reason, the tubes 6 must be constantly cleaned during the operation thereof for maximum efficiency. To this end, we provide a cleaning device utilizing clean air at a relatively high pressure directed inwardly through the walls of the filter tubes 6. The cleaning device comprises a generally rectangular carriage 11 mounted for reciprocatory movements in the frame structure 1 and longitudinally of the tubes 6, between the opposite ends thereof. The carriage 11 is carried by a plurality of flexible cables or the like 12 each connected at one end to the carriage 11 adjacent one of the corners thereof and running over one of a plurality of pulley wheels 13 suitably journalled in the upper ends of the legs 4. The flexible cables 12 extend downwardly in the hollow legs 4 and are connected at their other ends to weights 14 which counterbalance the weight of the carriage 11 and parts carried thereby. Reciprocatory movement is imparted to the carriage 11 by an electric motor 15 which drives a shaft 16 through speed reduction gearing, not shown but contained within a gear housing 17, see Fig. 1. A sprocket wheel 18 is mounted fast on the front end of the shaft 16 and has running thereover an endless drive chain 19 which also runs over a second sprocket 20 journalled in a bearing bracket 21 adjacent the lower end of the frame structure 1. The carriage 11 is connected to the drive chain 19 by a rigid link 22 which is pivotally connected to one of the links of the chain 19, as indicated at 23, and at its other end to a bracket 24 rigidly secured to the front end of the carriage 11, said pivotal connection being indicated at 25, see Figs. 2 and 3. The driving movement of the chain 19 and the resultant reciprocatory movement of the carriage 11 is at relatively slow speed.

The carriage 11 defines a header 26 to which is connected one end of a flexible conduit 27, the other end of which is coupled to a rigid conduit 28 leading from the discharge portion of a conventional blower or fan 29 shown as being powered by an electric motor or the like 30. The blower 29 is adapted to deliver clean air to the header 26 at relatively high pressure. Communicating at one end with the header 26 and extending transversely of the carriage 11 between adjacent rows of filter tubes 6 is a rigid delivery conduit 31. A plurality of cleaning rings 32, one each for each filter tube 6 in adjacent rows, each comprise a pair of opposed segmental cleaning ring sections 33 and 34 that are mounted on and supported by the delivery conduit 31 by means of rigid supporting arms 35. With reference to Figs. 3 to 5 inclusive, it will be seen that the supporting arms 35 are hinged at one end to the delivery conduit 31, as indicated at 36, and at their other ends to a cooperating cleaning ring section by means of a hinge 37, the axes of the hinge joints 36 and 37 being parallel to each other and to the axes of the filter tubes. The hinge arms 35 permit independent lateral swinging movement of each cleaning ring section 33 or 34 relatively to its cooperating ring section and to the adjacent cleaning rings 32. The ring sections 33 and 34 are provided adjacent their ends with anchoring pins or the like 38 between which extend coil tension springs 39. The springs 39 bias the cleaning rings 32 toward a contracted condition wherein the ring sections 33 and 34 are moved toward each other and toward engagement with the ring encompassed filter tube 6. The ring sections 33 and 34 are hollow whereby to define a circumferentially extended chamber 40 having an inlet 41 between which and an outlet nipple 42 on the rigid delivery conduit 31 is a coupling 43 of flexible material such as rubber, rubberized fabric, or the like. Air under relatively high pressure conducted to the chamber 40 of each segmental ring section 33 and 34 through the flexible conduits 43 is directed from the chamber 40 radially inwardly of the ring sections through circumferentially extended slots 44. With reference to Fig. 4, it will be seen that the slots 44 extend to the extreme ends of the cleaning ring sections so that, when said rings are in a spread apart or expanded condition, air will be directed against and through the entire peripheral surface of the ring encompassed portion filter tube 6. The jet of air impinging against the filter tubes through the slots 44, being under relatively high pressure, will overcome the pressure of the dust laden air within the tube 6 and dislodge dust particles from the inner wall surface thereof. Upon said dislodgement, dust particles will drop under the action of gravity to the dust collecting and disposal mechanism in the hopper. It will be further noted, by reference to Figs. 3 and 4, that the end portions of the ring sections 33 and 34 curve outwardly in a manner to prevent pinching of the tube 6 therebetween, thus eliminating any possibility of damage to the tubes 6 during travel of the rings thereon.

As above mentioned, during reciprocatory travel of the carriage 11 and the cleaning rings carried thereby, dust dislodged from the inner wall surface of the tube 6, during its descent toward the bottom of the tubes, may settle upon other dust particles in such a manner that bridging will occur to an extent that a bulge in the tube wall will result, as indicated by dotted lines in Fig. 1. When a descending cleaning ring of our invention encounters a bulged portion in one of the tubes 6, the springs 39 will permit movement of the cleaning ring sections 33 and 34 away from each other toward a ring expanded condition without causing a retarding of the travel of the carriage 11 or placing undue strain upon the fabric of the tube 6. During travel of the ring 32 over the bulged portion, air under pressure from the chamber 40 of the ring sections will disintegrate the bridge formed by the lodged dust, whereupon the dust will fall to the hopper 8 and the bulge in the tube wall will be eliminated. If desired, the relatively high pressure cleaning air may be shut off from the cleaning rings 32 during upward travel of the carriage 11 and introduced only during downward travel thereof, by suitable valve means, not shown, or by shutting off the motor 30 for the desired period of time. The hinged supporting arms 35 and the flexibility of the conduits 43 permit lateral shifting of the cleaning rings 32 so that the filter tubes 6 are maintained within the rings 32 without undue pressure being applied to one side or the other thereof by the segmental ring sections 33 or 34. In the event that the carriage 11 should shift laterally or each one of the filter tubes 6 is not precisely parallel to an adjacent tube, the hinged arm 35 will permit shifting of the cleaning rings 32 to compensate for such contingencies.

Our invention has been thoroughly tested and found to be completely satisfactory for the accomplishment of the objectives set forth; and, while we have shown and described a preferred embodiment of our novel cleaning ring structure and mounting means therefor, it will be understood that the same is capable of modification without departure from the spirit and scope of the invention, as defined in the claims.

What we claim is:

1. A cleaning device for tubular air filters of the type comprising a plurality of vertically extended tubes of flexible porous material connected at their upper ends by a plenum chamber having an inlet for dust laden air at relatively low pressure, and outlet means at the lower ends of said tubes for discharge of material filtered out of the air escaping through the interstices in the walls of said tubes; said cleaning device including a rigid delivery conduit, a plurality of cleaning rings one each associated with one of said tubes, each of said rings comprising a pair of diametrically opposed segmental ring sections adapted to encompass one of said tubes and movable toward and away from each other and said tube, yielding means biasing said cooperating ring sections toward each other and the associated tube, hinge means mounting each of said ring sections to said delivery conduit for lateral swinging movements independently of its cooperating ring section and the ring sections of adjacent cleaning rings, said hinge means comprising a plurality of arms each hinged at one end to a different one of said ring sections and at its other end to said delivery conduit for relative swinging movement on vertical axes, each of said ring sections defining a circumferentially extended chamber, flexible conduit connections between said delivery conduit and said sections for delivering air under relatively high pressure to each of said chambers, said conduit connections extending generally parallel to said arms, each of said ring sections having a circumferentially extended outlet opening directing the flow of air from its respective chamber radially inwardly toward the ring-engaged portion of its corresponding filter tube, means mounting said cleaning device for reciprocatory movements axially of the tube and mechanism for imparting said reciprocatory movements to the device.

2. In combination with an air cleaning device of the type comprising a frame structure, a plenum chamber at the upper end of said frame structure, said plenum chamber having an inlet for dust laden air at relatively low pressure, a plurality of laterally spaced vertically extended tubes of flexible porous material communicating at their upper ends with said plenum chamber, and outlet means at the lower ends of said tubes for discharge of material filtered out of the air escaping through the interstices in the walls of said tubes, a tube cleaning device comprising a generally rectangular carriage defining a header, means mounting said carriage for vertical reciprocatory movements in said frame structure, a rigid delivery conduit extending transversely of said carriage and communicating with said header, means for delivering air at relatively high pressure to said header and delivery conduit, a plurality of cleaning rings one each associated with one of said tubes, each of said rings comprising a pair of diametrically opposed segmental ring sections encompassing one of said tubes and movable toward and away from each other and said tube, yielding means biasing the cooperating ring sections toward each other and the associated tube, hinge means mounting each of said ring sections to said delivery conduit for lateral swinging movements independently of its cooperating ring section and the ring sections of adjacent cleaning rings, each of said ring sections defining a circumferentially extended chamber, and flexible conduit connections between said delivery conduit and said ring sections, each of said ring sections having a circumferentially extended outlet opening directing the flow of air from its respective chamber radially inwardly toward the ring engaged portion of its corresponding filter tube, and power operated mechanism for imparting reciprocatory movements to said carriage and the cleaning rings carried thereby.

3. In combination with an air cleaning device of the type comprising a frame structure, a plenum chamber at the upper end of said frame structure, said plenum chamber having an inlet for dust laden air at relatively low pressure, a plurality of spaced rows of laterally spaced vertically extended filter tubes of flexible porous material communicating at their upper ends with said plenum chamber, and outlet means at the lower ends of said tubes for discharge of material filtered out of the air escaping through the interstices in the walls of said tubes; a tube cleaning device comprising a generally rectangular carriage defining a header, means mounting said carriage for vertical reciprocatory movements in said frame structure, a rigid delivery conduit extending transversely of said carriage between adjacent rows of said tubes and communicating with said header, means for delivering air at relatively high pressure to said header and delivery conduit, a plurality of cleaning rings one each associated with one of said tubes, each of said rings comprising a pair of diametrically opposed segmental ring sections encompassing one of said tubes and movable toward and away from each other and the tube associated therewith, yielding means biasing the cooperating ring sections toward each other and their associated tube, hinge means mounting each of said ring sections to said delivery conduit for lateral swinging movements independently of its cooperating ring section and the ring sections of adjacent cleaning rings, the cleaning rings associated with the rows of tubes on opposite sides of said delivery conduit being hinged to diametrically opposite side portions of said delivery conduit, each of said ring sections defining a circumferentially extended chamber, and flexible conduit connections between said conduit and said ring sections extending generally parallel to said hinge means, each of said ring sections having a circumferentially extended outlet opening directing the flow of air from its respective chamber radially inwardly toward the ring engaged portion of its corresponding filter tube, and power operated mechanism for imparting reciprocatory movements to said carriage and the cleaning rings carried thereby.

ARTHUR B. OSGOOD.
ARDEN E. SWANSON.

References Cited in the file of this patent

UNITED STATES PATENTS

| Number | Name | Date |
|---|---|---|
| 2,551,126 | Hersey | May 1, 1951 |
| 2,552,191 | Lang | May 8, 1951 |